(12) United States Patent
Va et al.

(10) Patent No.: US 10,219,277 B1
(45) Date of Patent: Feb. 26, 2019

(54) VEHICLE INCLUDING DYNAMIC SENSOR-BASED PRECODING FOR MILLIMETER WAVE COMMUNICATION

(71) Applicant: TOYOTA JIDOSHA KABUSHIKI KAISHA, Toyota-shi, Aichi-ken (JP)

(72) Inventors: Vutha Va, Mountain View, CA (US); Takayuki Shimizu, Mountain View, CA (US); Gaurav Bansal, Mountain View, CA (US)

( * ) Notice: Subject to any disclaimer, the term of this patent is extended or adjusted under 35 U.S.C. 154(b) by 0 days.

(21) Appl. No.: 15/691,339

(22) Filed: Aug. 30, 2017

(51) Int. Cl.
*H04W 4/00* (2018.01)
*H04W 72/04* (2009.01)
*H04W 72/00* (2009.01)
*H04W 72/08* (2009.01)
*H04W 84/18* (2009.01)

(52) U.S. Cl.
CPC ..... *H04W 72/0453* (2013.01); *H04W 72/005* (2013.01); *H04W 72/085* (2013.01); *H04W 84/18* (2013.01)

(58) Field of Classification Search
CPC ........... H04W 72/0453; H04W 72/005; H04W 72/085; H04W 84/18
USPC .......................................... 370/329; 455/452
See application file for complete search history.

(56) References Cited

U.S. PATENT DOCUMENTS

| 8,229,017 B1 | 7/2012 | Lee et al. | |
|---|---|---|---|
| 8,469,122 B2 | 6/2013 | Perlman et al. | |
| 2009/0213901 A1* | 8/2009 | Berens | H04B 10/90 375/130 |
| 2015/0092676 A1 | 4/2015 | Periyalwar et al. | |

* cited by examiner

*Primary Examiner* — Marcos Batista
(74) *Attorney, Agent, or Firm* — Burbage Law, P.C.; Jon-Michael Burbage; Elizabeth Ruzich

(57) ABSTRACT

The disclosure includes a system and method implemented by a computer system of a vehicle that is a transmitter of a millimeter wave message ("mmWave message") which is transmitted to a receiver of the mmWave message. In some embodiments, the method includes measuring, by a perception sensor, sensor data describing the locations of objects that are proximate to the receiver and the transmitter. The method includes determining angle data describing one or more angles of arrival and one or more angels of departure for the objects. The method includes generating propagation data describing a list of paths between the transmitter and the receiver and channel gains for each path included in the list of paths. The method includes determining a plurality of channels for successfully transmitting the mmWave message to the receiver. The method includes transmitting the mmWave message to the receiver simultaneously using the plurality of channels.

20 Claims, 10 Drawing Sheets

L=4 (3 Single Reflection and 1 Line of Sight)
See, e.g., Figure 4A

Precoding can use multiple propagation paths to provide different data streams (spatial multiplexing) backup data streams (diversity of data streams). Paths P1, P2 and P3 are used in this example.

Analog beamforming uses only one of the available propagation paths. Paths P1 and P3 are not used in this example.

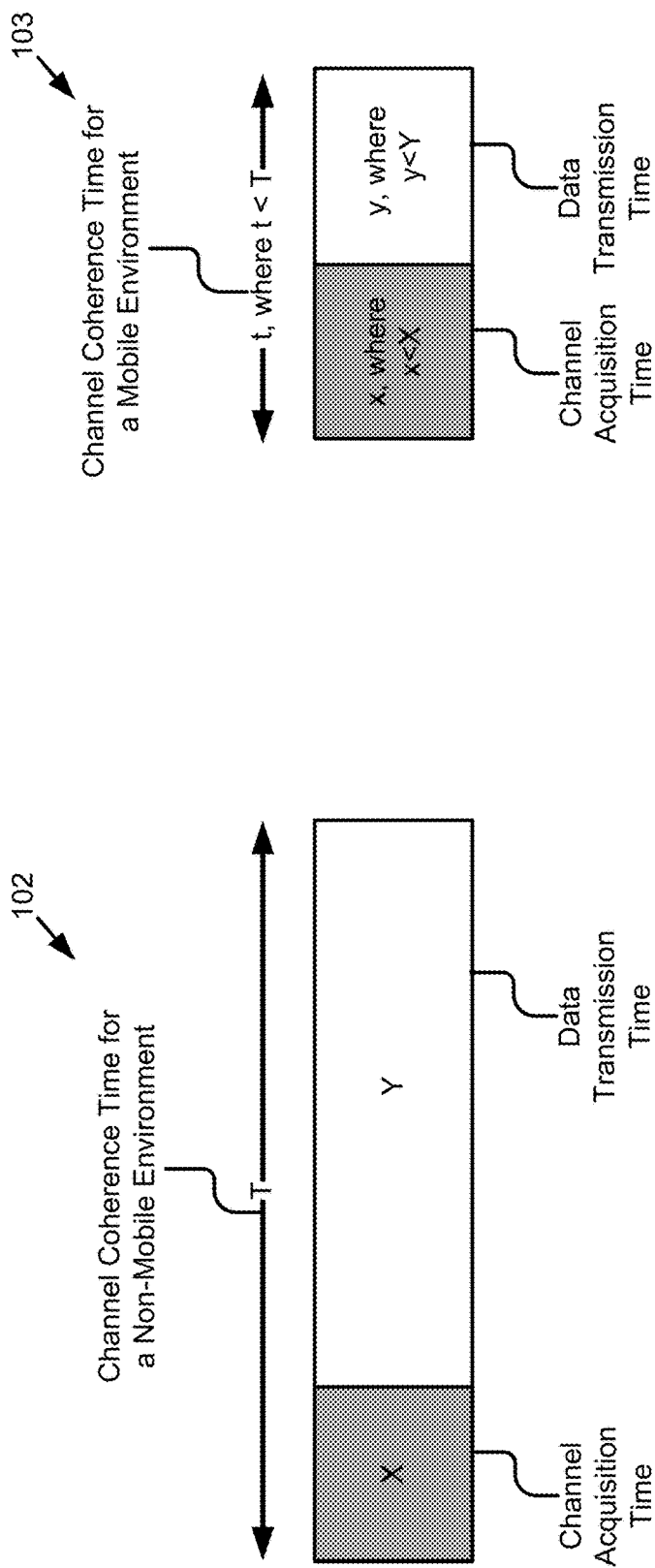

400

$$H = \sum_{i=1}^{L} \alpha_i \, a_{rx}(\theta^{(i)}_{AoA}) \, a^*_{tx}(\theta^{(i)}_{AoD})$$

Number of paths → $L$

Array response at RX and TX

AoA of the *i*-th path

AoD of the *i*-th path

Channel gain of the *i*-th path

Figure 4A

BSM DATA 190

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 5A

BSM DATA 190

Part 1
GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 5B

VEHICLE INCLUDING DYNAMIC SENSOR-BASED PRECODING FOR MILLIMETER WAVE COMMUNICATION

BACKGROUND

The specification relates to a vehicle including a precoding system for providing the vehicle with dynamic sensor-based precoding for millimeter wave ("mmWave") communication.

A mmWave message is a wireless message which is transmitted by a mmWave radio, i.e., via mmWave communication, on the band of spectrum between 30 gigahertz (GHz) and 300 GHz. A vehicular endpoint is a vehicle which includes a mmWave radio which is operable to send, receive, encode and decode mmWave messages.

Conventional vehicular mmWave communication is generally performed among vehicular endpoints using analog beamforming. However, analog beamforming is a problematic form of wireless communication because it can only use one of the many available propagation paths. As a result, analog beamforming frequently results in unreliable communications when there is an issue with the propagation path selected for transmitting a mmWave message. For example, mmWave communication may be prevented due to the presence of an object in the selected propagation path which prevents the mmWave message from reaching the receiver of the mmWave message (i.e., a "blockage"). As a result, mmWave communication among vehicular endpoints are generally not desirable because they cannot be consistently achieved. This inconsistency is particularly problematic when one or more of the vehicular endpoints is traveling a roadway speed (i.e., greater than or equal to 15 miles per hour).

SUMMARY

Disclosed are implementations of a precoding system for improving mmWave communication among one or more vehicular endpoints that are traveling at roadway speed (i.e., greater than or equal to 15 miles per hour) using sensor-based dynamic precoding. In some embodiments, the sensor-based dynamic precoding is exclusive of, and therefore does not include, analog beamforming. Our experiments and existing product is able to consistently transmit successful mmWave messages between one or more vehicular endpoints, even when one or more of these vehicular endpoints is traveling at roadway speed. A successful mmWave message is a wireless mmWave communication which is (1) transmitted by a transmitter and (2) successfully received by the receiver that was the intended recipient of the mmWave message as designated by the transmitter. In addition to working at roadway speeds, our experimentation shows that the precoding system described herein is able to consistently transmit successful mmWave messages in mobile environments such as roadways which include multiple vehicles traveling at roadway speeds in different headings, and buildings and other objects acting as reflective surfaces for the mmWave communication.

Existing solutions for mmWave communication among vehicular endpoints do not include precoding for dynamic applications (as used herein, a dynamic application is an attempted successful mmWave message by a vehicular endpoint in a mobile environment including one or more vehicular endpoints that are traveling at roadway speed on a roadway). This is because it is difficult to implement precoding in dynamic environments for the following example reasons: (1) precoding requires knowledge of the communication channel to be shared among the endpoints, and this knowledge is difficult to consistently acquire when one or both of the endpoints are in motion at roadway speeds (e.g., one of the endpoints is a vehicle or both of the endpoints is a vehicle); and (2) precoding requires more complex hardware than is typically required for analog beamforming, and it is difficult or impractical implement this hardware in a dynamic vehicle or mobile environment. As a result, existing solutions rely exclusively on analog beamforming and not precoding when attempting to successfully transmit a mmWave message.

The precoding system described herein solves this problem which have previously prevented others from achieving beamforming using precoding in dynamic application. In some embodiments, the precoding system includes a way of applying precoding in dynamic applications using one or more perception sensors and a precoding module. There is no existing solution for successfully achieving mmWave communication among one or more endpoints including a moving vehicle traveling at roadway speed wherein the solution which includes achieving beamforming among these endpoints through the use of precoding which is aided by perception sensors as is done by the precoding system.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method implemented by a computer system of a vehicle that is a transmitter of a mmWave message which is transmitted to a receiver of the mmWave message, the method including: measuring, by a perception sensor, sensor data describing one or more locations of one or more objects that are proximate to the receiver and the transmitter; determining, based on the sensor data, angle data describing one or more angles of arrival for the one or more objects and one or more angels of departure for the one or more objects; generating, based on one or more of the sensor data and the angle data, propagation data describing (1) a list of paths between the transmitter and the receiver and (2) channel gains for each path included in the list of paths; determining, based on one or more of the sensor data and the propagation data, a plurality of channels for successfully transmitting the mmWave message to the receiver; and transmitting the mmWave message to the receiver simultaneously using the plurality of channels on a band of spectrum between 30 GHz and 300 GHz. Other embodiments of this aspect include corresponding computer systems, apparatus, and computer programs recorded on one or more computer storage devices, each configured to perform the actions of the methods.

Implementations may include one or more of the following features. The method where a perception sensor is any sensor operable to measure the locations of the one or more objects. The method where the list of paths includes one or more of the following: (1) a line of sight path between the transmitter and the receiver of the mmWave message; and (2) one or more single reflection paths between the transmitter and the receiver. The method where the propagation data is determined by channel training using the sensor data and the angle data as inputs, where the channel training outputs the propagation data based on these inputs. The method where the plurality of channels is organized as a channel matrix. The method where two or more of the channels are simultaneously used to transmit the mmWave message in order to provide a redundancy and a diversity of data. The method where the perception sensor is an element of a different electronic device and the sensor data is wirelessly transmitted to the vehicle. Implementations of the described techniques may include hardware, a method or process, or computer software on a computer-accessible medium.

One general aspect includes a system of a vehicle that is a transmitter of a mmWave message which is transmitted to a receiver of the mmWave message, the system including: a mmWave radio; a perception sensor; and an onboard vehicle computer system that is communicatively coupled to the mmWave radio and the perception sensor, the onboard vehicle computer system including a non-transitory memory storing computer code which, when executed by the onboard vehicle computer system causes the onboard vehicle computer system to: measure, by the perception sensor, sensor data describing one or more locations of one or more objects that are proximate to the receiver and the transmitter; determine, based on the sensor data, angle data describing one or more angles of arrival for the one or more objects and one or more angels of departure for the one or more objects; generate, based on one or more of the sensor data and the angle data, propagation data describing (1) a list of paths between the transmitter and the receiver and (2) channel gains for each path included in the list of paths; determine, based on one or more of the sensor data and the propagation data, a plurality of channels for successfully transmitting the mmWave message to the receiver; and transmit, by the mmWave radio, the mmWave message to the receiver using the plurality of channels on a band of spectrum between 30 GHz and 300 GHz. Other embodiments of this aspect include corresponding computer systems, apparatus, and computer programs recorded on one or more computer storage devices, each configured to perform the actions of the methods.

Implementations may include one or more of the following features. The system where a perception sensor is any sensor operable to measure the locations of the one or more objects. The system where the list of paths includes one or more of the following: (1) a line of sight path between the transmitter and the receiver of the millimeter wave; and (2) and one or more single reflection paths between the transmitter and the receiver. The system where the propagation data is determined by channel training using the sensor data and the angle data as inputs, where the channel training outputs the propagation data based on these inputs. The system where the plurality of channels is organized as a channel matrix. The system where two or more of the channels are simultaneously used to transmit the mmWave message in order to provide a redundancy and a diversity of data. The system where the receiver is a different vehicle. The computer program product where a perception sensor is any sensor operable to measure the locations of the one or more objects. Implementations of the described techniques may include hardware, a method or process, or computer software on a computer-accessible medium.

One general aspect includes a computer program product including a non-transitory memory of an electronic control unit of a vehicle storing computer-executable code that, when executed by the electronic control unit, causes the electronic control unit to: measure, by a perception sensor, sensor data describing one or more locations of one or more objects that are proximate to a receiver and a transmitter of a mmWave message, where the vehicle is the transmitter of the mmWave message; determine, based on the sensor data, angle data describing one or more angles of arrival for the one or more objects and one or more angels of departure for the one or more objects; generate, based on one or more of the sensor data and the angle data, propagation data describing (1) a list of paths between the transmitter and the receiver and (2) channel gains for each path included in the list of paths; determine, based on one or more of the sensor data and the propagation data, a plurality of channels for successfully transmitting the mmWave message to the receiver; and transmit the mmWave message to the receiver using the plurality of channels on a band of spectrum between 30 GHz and 300 GHz. Other embodiments of this aspect include corresponding computer systems, apparatus, and computer programs recorded on one or more computer storage devices, each configured to perform the actions of the methods.

Implementations may include one or more of the following features. The computer program product where a perception sensor is any sensor operable to measure the locations of the one or more objects. The computer program product where the list of paths includes one or more of the following: (1) a line of sight path between the transmitter and the receiver of the millimeter wave; and (2) and one or more single reflection paths between the transmitter and the receiver. The computer program product where the propagation data is determined by channel training using the sensor data and the angle data as inputs, where the channel training outputs the propagation data based on these inputs. The computer program product where the plurality of channels is organized as a channel matrix. The computer program product where two or more of the channels are simultaneously used to transmit the mmWave message in order to provide a redundancy and a diversity of data. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1C is a block diagram illustrating a prior art example of channel coherence for mmWave communication in a non-mobile environment.

FIG. 1D is a block diagram illustrating a prior art example of channel coherence for mmWave communication in a mobile environment.

FIG. 4A is a block diagram illustrating an example analysis for providing dynamic sensor-based precoding to successfully transmit a mmWave message in a mobile environment in which at least one of the endpoints is a vehicle traveling at roadway speed.

FIG. 5A is a block diagram illustrating an example of BSM data according to some embodiments.

FIG. 5B is a block diagram illustrating an example of BSM data according to some embodiments.

DETAILED DESCRIPTION

Figures 1A, 1B:
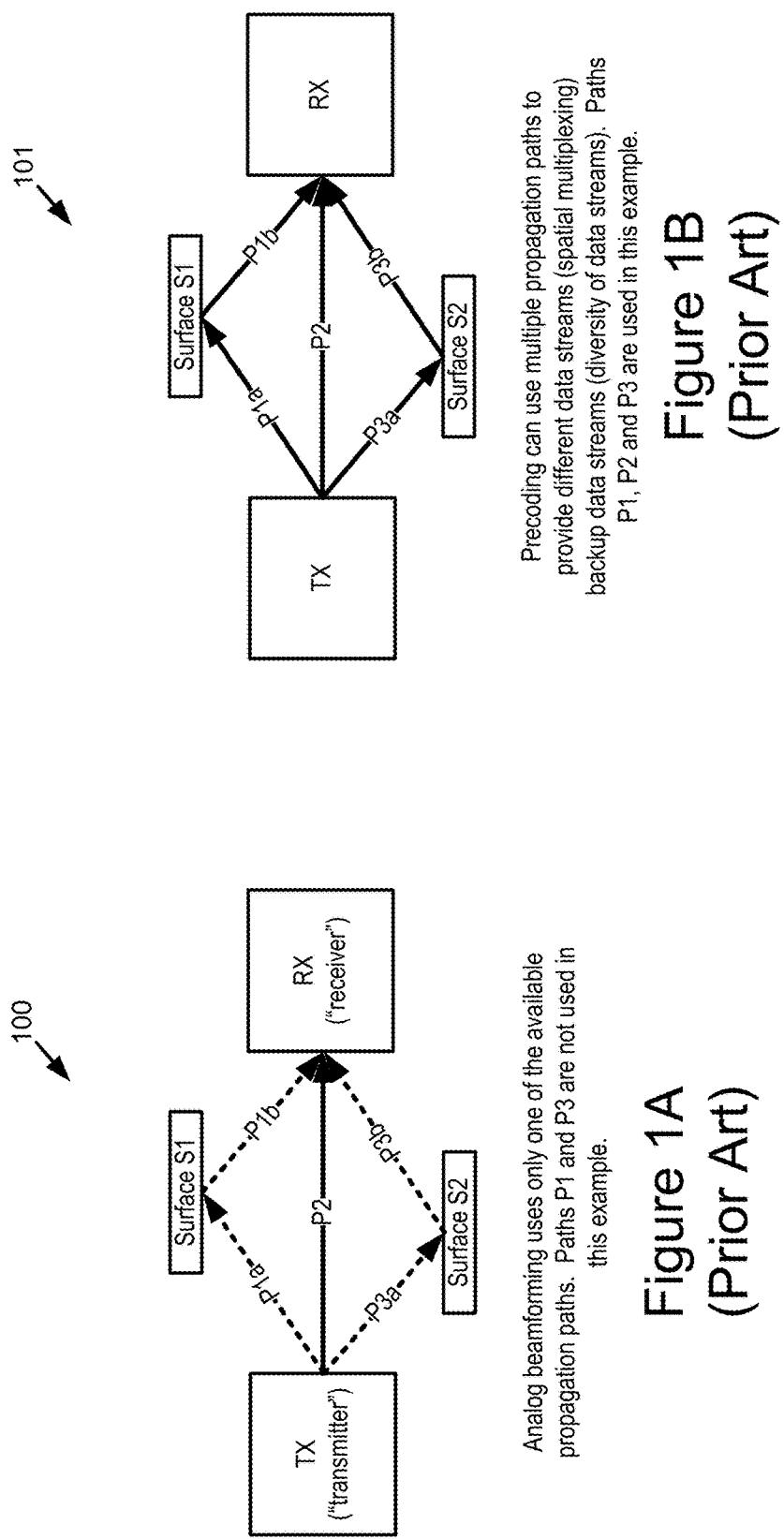
FIG. 1A is a block diagram illustrating a prior art example of analog beamforming for mmWave communications.
FIG. 1B is a block diagram illustrating a prior art example of conventional precoding for mmWave communications.

Described herein are embodiments of a precoding system. The precoding system includes a novel way of consistently achieving mmWave communication between two vehicles that are in motion (vehicle-to-vehicle, i.e., "V2V") or between a vehicle and an infrastructure device (vehicle-to-infrastructure, i.e., "V2I") such as a non-vehicular roadway endpoint (e.g., a roadside unit ["RSU"], roadway infrastructure such as a red light, or any other non-vehicular roadway endpoint including the ability to send and receive mmWave messages) without using analog beamforming. Instead, the precoding system replaces analog beamforming with a novel approach to mmWave precoding is referred to herein as "sensor-based dynamic precoding."

Sensor-Based Dynamic Precoding

In some embodiments, sensor-based dynamic precoding is precoding between endpoints of a mmWave message where at least one of the endpoints is in motion at roadway speed (e.g., greater than 15 mph). The precoding system uses sensor-based dynamic precoding to successfully and consistently achieve mmWave communication for dynamic applications that include at least one of the endpoints of a mmWave communication being a vehicle which is in motion at roadway speed. In some embodiments, the precoding system is an element of a vehicle.

In some embodiments, the precoding system achieves sensor-based dynamic precoding by using one or more perception sensors to perform fast channel acquisition for the mmWave communication. In some embodiments, the one or more perceptions sensors are elements of an onboard sensor set of the vehicle which includes the precoding system. For example, the one or more perception sensors are elements of the precoding system, which is itself an element the vehicle.

In some embodiments, there are two endpoints for each mmWave communication: (1) a transmitter which transmits the mmWave message; and (2) a receiver which receives the mmWave communication. Each of these endpoints is equipped with mmWave radios. An example novel feature of the precoding system is that both the transmitter and the receiver are also equipped with (1) one or more perception sensors and (2) a precoding module which is operable to provide some or all of the functionality described herein with reference to the precoding system (see, e.g., FIGS. 2 and 3).

In some embodiments, the transmitter is an endpoint of a mobile environment which includes the precoding system. For example, the transmitter is a roadway device which is located in a mobile environment such as a vehicle or a non-vehicular roadway endpoint. In some embodiments, the receiver is an endpoint of the mobile environment which is different than the transmitter (i.e., not the exact same roadway device as the transmitter). For example, the receiver is a vehicle or a non-vehicular roadway endpoint which is located in the mobile environment and not the exact same roadway device as the transmitter. It will be understood that, although the transmitter and the receiver are not the exact same roadway device, in some embodiments the transmitter and the receiver are the same type of device. For example, both the transmitter and the receiver are vehicles (which is an example of a type of roadway device which is located in a mobile environment).

In some embodiments, the perception sensors provide the precoding module of the transmitter with sensor data. The sensor data is digital data describing, among other things, a description of the locations of one or more objects surrounding the transmitter. The description of the locations of the one or more objects surrounding the transmitter are used by the precoding module to predict potential propagation of a mmWave message transmitted by the transmitter. Channel training is performed by the precoding module to generate a list of paths. The precoding module uses the list of paths to determine a channel for transmitting the mmWave message. The precoding module then causes the mmWave radio to perform beam forming with multiple beams using the channel. The mmWave radio of the precoding system can then successfully transmit the mmWave message to the intended recipient of the mmWave message.

Analog Beamforming Versus mmWave Precoding

Referring now to FIG. 1A, depicted is a block diagram illustrating a prior art example 100 of analog beamforming used in mmWave communications.

The transmitter of the mmWave message is indicated by the letters "TX." The receiver of the mmWave message is indicated by the letters "RX." This shorthand is repeated in other portions of this description.

The transmitter has a plurality of propagation paths available to it for transmitting the mmWave message: (1) path P1; (2) path P2; and (3) path P3. A propagation path is a mmWave transmission path which leads begins at the transmitter of a mmWave message and ends at the intended receiver of the mmWave message. The intended receiver of the mmWave message if an endpoint who the transmitter of a mmWave message actually intended to receive mmWave message.

Path P1 includes two segments: (1) segment P1a; and (2) segment P1b. Segment P1a is a portion of path P1 which occurs prior to a time or location when path P1 includes a surface S1. The surface S1 is a tangible object which has physical properties which enable it to reflect a mmWave message. Segment P1b is a portion of the path P1 which occurs after the time or location when path P1 includes the surface S1 and terminates with the intended receiver RX.

Path P3 includes two segments: (1) segment P3a; and (2) segment P3b. Segment P3a is a portion of path P3 which occurs prior to a time or location when path P3 includes a surface S2. The surface S2 is a tangible object which has physical properties which enable it to reflect a mmWave message. Segment P3b is a portion of the path P3 which occurs after the time or location when path P3 includes the surface S2 and terminates with the intended receiver RX.

Path P1 and path P3 are examples of a single reflection path because a mmWave message transmitted along either of these paths would only reflect off one tangible surface one time before arriving at the intended receiver of the mmWave message.

Path P2 is an example of a line of sight path between the transmitter and the receiver because a mmWave message transmitted along this path would not reflect off any tangible surface prior to arriving at the intended receiver of the mmWave message.

mmWave communication which relies on analog beamforming is a problematic form of communication because analog beamforming can only use one of the available propagation paths (e.g., path P2), herein referred to as the "single selected propagation path." mmWave communication which relies on analog beamforming is unreliable because the mmWave message is not successfully sent if there is any issue with the single selected propagation path. In addition, the rate of data transmission is generally slow because mmWave radios which use analog beamforming are incapable of supporting multiple data streams (i.e., spatial multiplexing).

Because of these shortcomings, mmWave communications which rely on analog beamforming are undesirable for critical vehicle applications such as automated driving and other applications which require a high guarantee that wireless messages will be successfully and quickly transmitted to the intended recipient.

Referring now to FIG. 1B, depicted is a block diagram illustrating a prior art example 101 of conventional precoding used in mmWave communications. The example 101 does not include the use of any sensors (i.e., perception sensors) to identify the locations of objects proximate to the transmitter (TX) of the mmWave message or implicated by the transmission of the mmWave message to the receiver (RX). Accordingly, the example 101 does not depict "dynamic sensor-based precoding" as described herein. As described herein, dynamic sensor-based precoding requires the use of one or more perception sensors to measure the locations of one or more objects that are proximate to the transmitter as well as the digital data that describes the measurements of these one or more perception sensors.

FIG. 1B includes some elements similar to FIG. 1A, and so, those descriptions will not be repeated here. However, the mmWave radio of the transmitter and the receiver in FIG. 1B are operable to transmit and receive mmWave messages using mmWave precoding.

Conventional precoding takes advantage of all available propagation paths (e.g., each of path P1, path P2 and path P3). The different paths may support different data streams such that each path can be used to transmit different pieces of data, thereby increasing the rate of data transmission relative to analog beamforming. Alternatively, the different paths may be used as a backup, such that when one path has issues with rate or reliability, a different path may be used for mmWave communications. However, example shortcomings of mmWave communications which use conventional mmWave precoding for vehicular applications are described below with reference to FIGS. 1C and 1D (and specifically, by comparing FIG. 1C to FIG. 1D).

Example Shortcomings of Conventional mmWave Precoding for Vehicular Applications In communications systems, a communication channel may change with time. Coherence time is the time duration over which the channel impulse response is considered to be not varying. Such channel variation is much more significant in wireless communications systems, such as mmWave communication, due to Doppler effects.

mmWave precoding presents some technical problems when applied to mmWave communication in mobile environments because conventional precoding requires knowledge of a communication channel to use for transmitting the mmWave message. In non-mobile environments, i.e. static environments where transmitters and receivers are not traveling at roadway speeds, channel acquisition time is not a problem because the data transmission time is extensive. In mobile environments, on the other hand, the channel acquisition time is severely reduced.

By comparison, the dynamic sensor-based precoding described herein, and provided by the precoding system, does not suffer from the coherence time disadvantages of conventional precoding. Our experimentation has shown that successful transmission of a mmWave message without knowledge of the channel is possible if the acquisition for all possible angles are determined prior to attempting to transmit the mmWave message. The possible angles include the following: one or more angles of arrival ("AoA" if singular, "AoAs" if plural) for one or more objects in the vicinity of the transmitter and the receiver; and one or more angles of departure ("AoD" if singular, "AoDs" if plural) for the one or more objects. As the transmitter and the receiver move, it results in the need of the transmitter of the mmWave message to determine additional AoAs and AoDs (e.g., because the location of one or more of the transmitter, the receiver and the objects are dynamic). Thus, the channel acquisition time reduces as the speed of a transmitter and/or a receiver increases. This concept is depicted by comparing FIGS. 1C and 1D.

Referring now to FIG. 1C, depicted is a block diagram illustrating a prior art example 102 of channel coherence for mmWave communication in a non-mobile environment. The channel coherence time is represented by the variable "T." The channel coherence time is the sum of the channel acquisition time, represented by the variable "X," and the data transmission time, represented by the variable "Y." As shown in FIG. 1D, the data transmission time and the channel acquisition time are reduced in mobile environments due to the driving speed of one or more of the transmitter and the receiver.

Referring now to FIG. 1D, depicted is a block diagram illustrating a prior art example 103 of channel coherence for mmWave communication in a mobile environment. FIG. 1D is described with reference to FIG. 1C. In FIG. 1D, the channel coherence time is represented by the variable "t" where "t" is always less than "T" (as depicted in FIG. 1C) such the channel coherence time is always less in the mobile environment of FIG. 1D when compared to the non-mobile environment of FIG. 1C. Referring to FIG. 1D, the channel coherence time is the sum of the channel acquisition time, represented by the variable "x," and the data transmission time, represented by the variable "y." The channel acquisition time, x, in the mobile environment of FIG. 1D is less than the channel acquisition time, X, in the non-mobile environment of FIG. 1C. The data transmission time, y, in the mobile environment of FIG. 1D is less than the channel acquisition time, Y, in the non-mobile environment of FIG. 1C.

Channel coherence time for a mmWave communication decreases as the speed of the transmitter or receiver of a mmWave message increases; channel coherence time for a mmWave communication is thus inversely proportional to the speed of the transmitter or receiver of the mmWave message included in the mmWave communication. For example, the following are actual channel coherence times for a mobile environment assuming an angle of arrival of 120 degrees for a transmitted mmWave message: the channel coherence time is approximately 1.60 seconds if one or more of the transmitter or the receiver is traveling at a speed of 20 meters per second; the channel coherence time is 0.78 seconds if one or more of the transmitter or the receiver is traveling at a speed of 30 meters per second; the channel coherence time is 0.59 seconds if one or more of the transmitter or the receiver is traveling at a speed of 40 meters per second; the channel coherence time is 0.43 seconds if one or more of the transmitter or the receiver is traveling at a speed of 50 meters per second; the channel coherence time is 0.38 seconds if one or more of the transmitter or the receiver is traveling at a speed of 60 meters per second; the channel coherence time is 0.25 seconds if one or more of the transmitter or the receiver is traveling at a speed of 100 meters per second.

Precoding System Overview

In some embodiments, the precoding system described herein assumes that the transmitter and the receiver of a mmWave message are each equipped with a precoding system (i.e., that all endpoints of the mmWave message are equipped with a precoding system).

In some embodiments, a precoding system includes the following elements: (1) a mmWave radio; (2) a lower frequency radio; (3) one or more perception sensors; and (4) a precoding module. The lower frequency radio is a radio which transmits and receives wireless messages on a lower frequency than the mmWave radio.

In some embodiments, the mmWave radio is used to form multiple beams. The lower frequency radio is used for node discovery. The one or more perception sensors provide sensor data. The sensor data is digital data that describes the locations of one or more objects which surround the vehicle (or some other endpoint) which includes the precoding system. The vehicle includes a processor (e.g., a processor of an onboard vehicle computer, electronic control unit or onboard unit). The precoding module includes code and routines that are operable, when executed by the processor, to analyze the sensor data and estimate potential propagation of the one or more objects which surround the vehicle. The potential propagation outputted by executing the precoding module using the sensor data as an input is described in terms of one or more AoAs and one or more AoDs as determinable based on the sensor data which describes the measurements of the one or more perception sensors. The potential propagation also describes For example, the one or more perception sensors generate sensor data describing the locations of one or more objects at one or more times. The precoding module includes code and routines that are operable, when executed by the processor, to analyze the sensor data and estimate angle data describing one or more AoAs and one or more AoDs for the one or more objects whose locations are described by the sensor data. The precoding module includes further code and routines that are operable, when executed by the processor, to analyze one or more of the angle data and the sensor data to determine propagation data that describes a line-of-sight path and all single-reflection paths which separate the transmitter of the mmWave message and the recipient of the mmWave message.

In some embodiments, the determination of the propagation data is further based on global position system data ("GPS data") describes: (1) the geographic location of the intended recipient of the mmWave message; and (2) the geographic location of the transmitter of the mmWave message. This GPS data provides a means for building a grid (or some other data structure) that includes a first point in space for the transmitter of the mmWave message and a second point in space for the intended recipient of the mmWave message. The angle data and the sensor data are then applied to this grid so that the locations of other objects on the grid are known, as well as their AoAs and AoDs. This grid, when projected over time based on the AoAs and AoDs, provides a basis for determining a line-of-sight path and one or more single-reflection paths between the transmitter and the recipient.

In some embodiments, the precoding module includes code and routines that are operable, when executed by the processor, to analyze the propagation data and the sensor data to determine a list of channels which are usable for transmitting the mmWave message using one or more channels. In some embodiments, the list of channels is organized as a channel matrix.

In some embodiments, the precoding module includes code and routines that are operable, when executed by a processor of the vehicle, to execute one or more steps of the method described below with reference to FIG. 3, the analysis described below with reference to FIG. 4A and the process flow described below with reference to FIG. 4B.

Dedicated Short Range Communication

A DSRC-equipped vehicle is a vehicle which includes a DSRC radio and is operable to lawfully send and receive DSRC messages in a jurisdiction where the DSRC-equipped vehicle is located. A DSRC radio is hardware that includes a DSRC receiver and a DSRC transmitter, and is operable to wirelessly send and receive DSRC messages.

A DSRC message is a wireless message that is specially configured to be send and received by highly mobile devices such as vehicles, and is compliant with one or more of the following DSRC standards, including any derivative or fork thereof: EN 12253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); and EN 13372:2004 Dedicated Short-Range Communication (DSRC)-DSRC profiles for RTTT applications (review); EN ISO 14906:2004 Electronic Fee Collection-Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. For example, FIGS. 5A and 5B depict an example of a permissible payload for a particular type of DSRC message referred to as a BSM message. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane of a multi-lane roadway a vehicle using for travel.

In some embodiments, a DSRC-compliant GPS unit is operable to identify, monitor and track its two-dimensional position within 1.5 meters of its actual position 68% of the time under an open sky.

System Overview

Figure 1E:
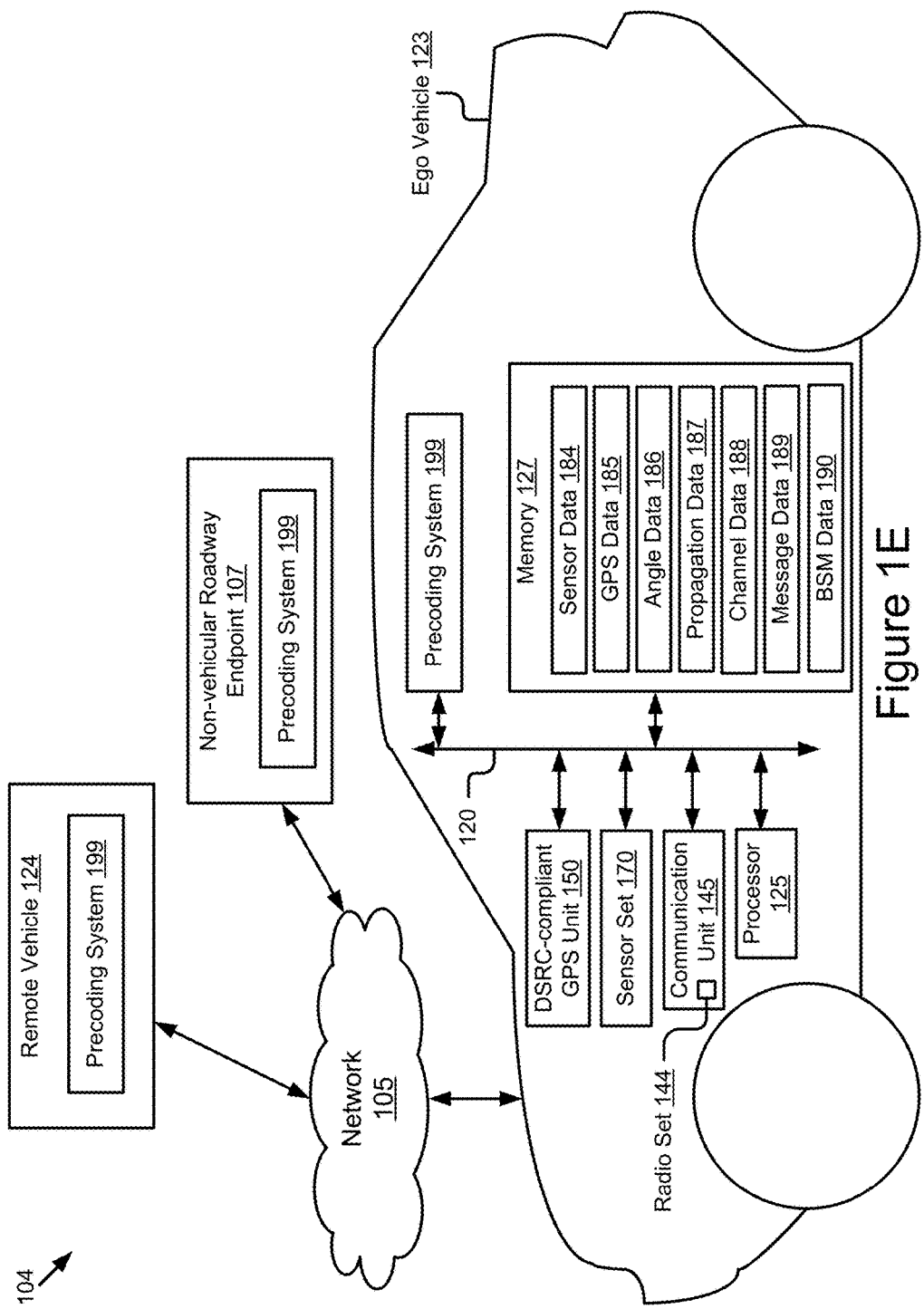
FIG. 1E is a block diagram illustrating an example operating environment for a precoding system according to some embodiments.

Referring to FIG. 1E, depicted is an operating environment 104 for a precoding system 199 according to some embodiments. As depicted, the operating environment 104 includes the following elements: an ego vehicle 123; a remote vehicle 124; and a non-vehicular roadway endpoint 107. These elements are communicatively coupled to one another by a network 105.

Although one ego vehicle 123, one remote vehicle 124, one non-vehicular roadway endpoint 107 and one network 105 are depicted in FIG. 1, in practice the operating environment 104 may include one or more ego vehicles 123, one or more remote vehicles 124 and one or more networks 105.

In practice, the ego vehicle 123, the remote vehicle 124 and the non-vehicular roadway endpoint 107 are each located in a mobile environment in which one or more of the ego vehicle 123 and the remote vehicle 124 is traveling at a roadway speed. The roadway speed is greater than or equal to 15 miles per hour because conveyances such as the ego vehicle 123 and the remote vehicle 124 would not typically travel at speeds equal to or greater than 15 miles per hour unless present on a roadway. This speed is also relevant since it is known that channel coherence time is particularly short, and mmWave communications are particularly difficult (whether by analog beamforming or mmWave precoding), at speeds which are greater than or equal to 15 miles per hour.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the ego vehicle 123 and the remote vehicle 124 are DSRC-equipped vehicles. The network 105 may include a DSRC communication channel shared among the ego vehicle 123 and the remote vehicle 124.

The ego vehicle 123 is any type of vehicle. For example, the ego vehicle 123 is one of the following types of vehicles: a car; a truck; a sports utility vehicle; a bus; a semi-truck; a drone or any other roadway-based conveyance. The remote vehicle 124 may be any type of vehicle as well. In some embodiments, the remote vehicle 124 is a delivery truck.

In some embodiments, one or more of the ego vehicle 123 and the remote vehicle 124 are an autonomous vehicle or a semi-autonomous vehicle. For example, the ego vehicle 123 includes a set of Advanced Driver Assistance Systems (a set of "ADAS systems") which provide autonomous features to the ego vehicle 123 which are sufficient to render the ego vehicle 123 an autonomous vehicle.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems installed in a vehicle have no vehicle control, but may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgement). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle ("HAV") is an autonomous vehicle that is Level 3 or higher (i.e., greater than or equal to Level 3 as defined above).

Accordingly, in some embodiments one or more of the ego vehicle 123 and the remote vehicle 124 are one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the ego vehicle 123 includes the following elements: a processor 125; a memory 127; a communication unit 145 (including a DSRC radio); a DSRC-compliant GPS unit 150; a sensor set 170; and a precoding system 199. These elements of the ego vehicle 123 are communicatively coupled to one another via a bus 120.

Figure 2:
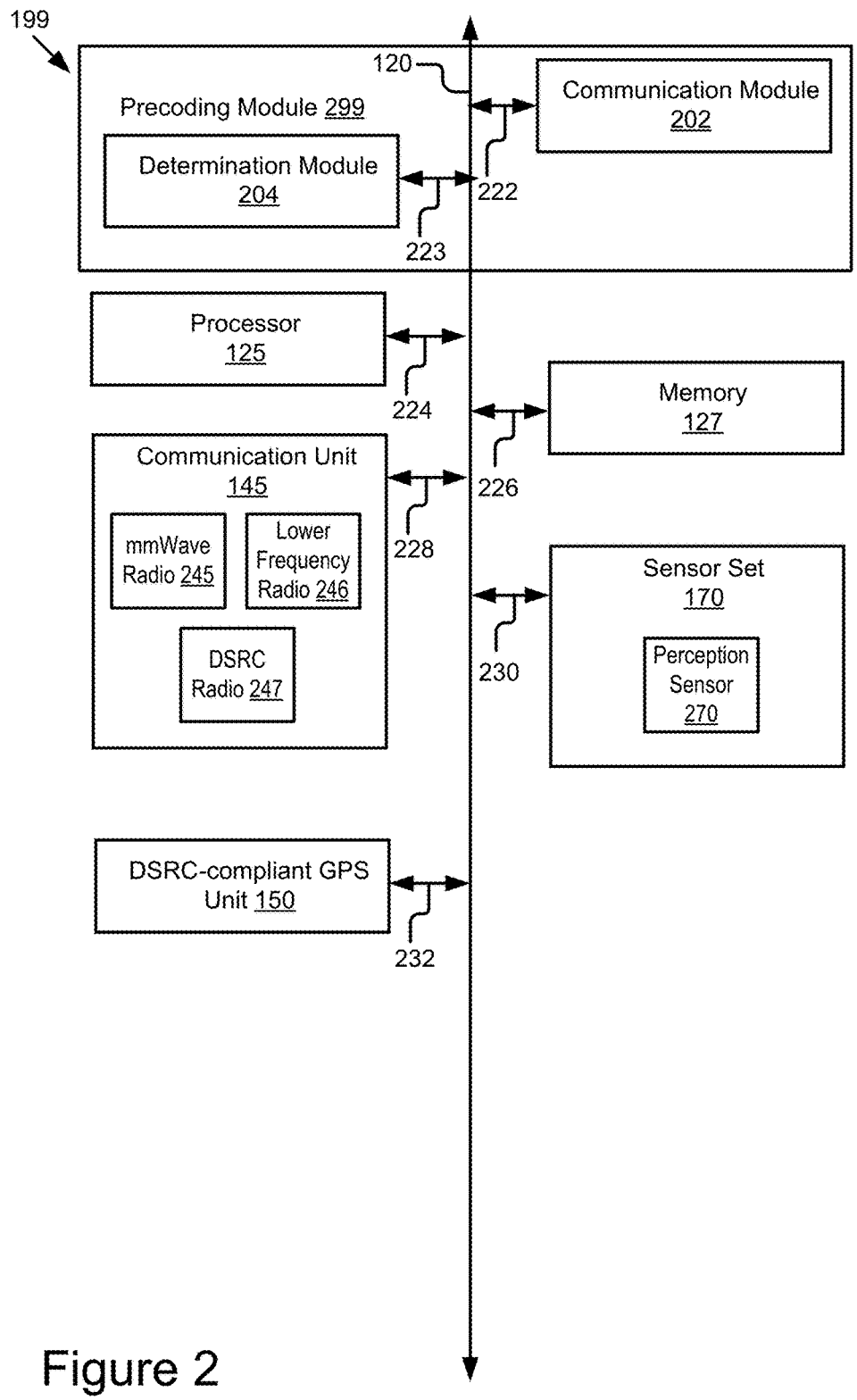
FIG. 2 is a block diagram illustrating an example computer system including the precoding system according to some embodiments.

In some embodiments, the processor 125 and the memory 127 may be elements of an onboard vehicle computer system of the ego vehicle 123. The onboard vehicle computer system may be operable to cause or control the operation of the precoding system 199. The onboard vehicle computer system may be operable to access and execute the data stored on the memory 127 to provide the functionality described herein for the precoding system 199 or its elements (see, e.g., FIG. 2). The onboard vehicle computer system may be operable to execute the precoding system 199 which causes the onboard vehicle computer system to execute one or more of the steps of the method 300 described below with reference to FIG. 3. In some embodiments, FIG. 2 depicts an example of an onboard vehicle computer system.

In some embodiments, the processor 125 and the memory 127 may be elements of an onboard unit. The onboard unit includes an electronic control unit (herein "ECU") or an onboard vehicle computer system that may be operable to cause or control the operation of the precoding system 199. The onboard unit may be operable to access and execute the data stored on the memory 127 to provide the functionality described herein for the precoding system 199 or its elements. The onboard unit may be operable to execute the precoding system 199 which causes the onboard unit to execute one or more of the steps of the method 300 described below with reference to FIG. 3. In some embodiments, FIG. 2 depicts an example of an onboard unit.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); and EN 13372:2004 Dedicated Short-Range Communication (DSRC)-DSRC profiles for RTTT applications (review); EN ISO 14906:2004 Electronic Fee Collection-Application interface.

In some embodiments, the DSRC-compliant GPS unit 150 is operable to provide GPS data 185 describing the location of the ego vehicle 123 with lane-level accuracy. Lane-level accuracy means that the location of the ego vehicle 123 is described by the GPS data 185 so accurately that the ego vehicle's 123 lane of travel on a roadway may be accurately determined based on the GPS data 185 for this ego vehicle 123 as provided by the DSRC-compliant GPS unit 150.

In some embodiments, one or more of the remote vehicle 124 and the non-vehicular roadway endpoint 107 are DSRC-enabled, and thus include their own instance of the DSRC-compliant GPS unit 150, and the GPS data 185 includes digital data that describes the location of one or more of the following: one or more remote vehicles 124; and one or more non-vehicular roadway endpoints 107. This digital data is received, for example, via one or more DSRC messages (e.g., a BSM message) transmitted by the one or more remote vehicles 124 and the one or more non-vehicular roadway endpoints 107.

In some embodiments, in the context of the precoding system 199, lane-level accuracy enables the precoding system 199 to the sensor data 184 (which would include the GPS data 185) and determine more accurate AoAs and AoDs (i.e., more accurate angle data 186), which further results in more accurate determination of the propagation data and channel data. This increased ultimately results in a decreased likelihood that a mmWave message transmitted with the benefit of the dynamic sensor-based precoding provided by the precoding system 199 will be will be unsuccessful.

In some embodiments, the DSRC-compliant GPS unit 150 includes hardware that wirelessly communicates with a GPS satellite to retrieve GPS data 185 that describes the geographic location of the ego vehicle 123 with a precision that is compliant with the DSRC standard. The DSRC standard requires that GPS data 185 be precise enough to infer if two vehicles (one of which is, for example, the ego vehicle 123) are located in adjacent lanes of a roadway. In some embodiments, the DSRC-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data 185 is less than 1.5 meters the precoding system 199 described herein may analyze the GPS data 185 provided by the DSRC-compliant GPS unit 150 and determine what roadway lane the ego vehicle 123 is traveling in based on the relative positions of two or more different vehicles (one of which is, for example, the ego vehicle 123) traveling in different lanes of travel on a roadway at the same time.

By comparison to the DSRC-compliant GPS unit 150, a conventional GPS unit which is not compliant with the DSRC standard is unable to determine the location of an ego vehicle 123 with lane-level accuracy. For example, a typical lane of a roadway is approximately 3 meters wide. However, a conventional GPS unit only has an accuracy of plus or minus 10 meters relative to the actual location of the ego vehicle 123. As a result, such conventional GPS units are not sufficiently accurate to identify which roadway lane a vehicle such as the ego vehicle 123 is traveling in. Inclusion of a conventional GPS unit in the precoding system results in less accurate determinations of AoAs and AoDs, and therefore less accurate channel data and an increased instance of unsuccessful mmWave message transmissions.

The sensor set 170 includes one or more sensors that are operable to measure the physical environment outside of the ego vehicle 123. For example, the sensor set 170 may include one or more sensors that record one or more physical characteristics of the physical environment that is proximate to the ego vehicle 123. The memory 127 may store sensor data 184 that describes the one or more physical characteristics recorded by the sensor set 170.

In some embodiments, the sensor data 184 includes one or more of the following: GPS data 185 provided by other DSRC-enabled devices (e.g., via a DSRC message) such as the remote vehicle 124 and the non-vehicular roadway endpoint 107 and describing the location of these DSRC-enabled devices; and GPS data 185 describing the location of the ego vehicle 123.

In some embodiments, the sensor data 184 is used by the precoding system 199 to verify the accuracy of the GPS data 185. For example, the GPS data 185 may indicate that the ego vehicle 123 is located near a particular landmark, and the sensor data 184 may include a digital image that includes the particular landmark, thereby confirming the accuracy of the GPS data 185.

In some embodiments, the sensor set 170 of the ego vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 170 includes one or more perception sensors 270 as depicted in FIG. 2. A perception sensor 270 is any sensor that is capable of measuring, or providing sensor data 184 to the precoding system 199 describing, the locations of one or more objects which are proximate to the ego vehicle 123 (or some other device that includes the precoding system 199 such as the remote vehicle 124 and the non-vehicular roadway endpoint 107).

In some embodiments, the DSRC-compliant GPS units 150 of other devices which are proximate to the ego vehicle 123 (such as the remote vehicle 124 and the non-vehicular roadway endpoint 107) are perception sensors 270 because they provide the precoding system 199 with GPS data 185 (which is included in the sensor data 184) describing the location of the device which includes them as an element. For example, if (1) the communication unit of the remote vehicle 124 broadcasts a BMS message including GPS data 185 describing the location of the remote vehicle 124 and (2) this BSM message is received by the communication unit 145 of the ego vehicle 123, then the DSRC-compliant GPS unit 150 of the remote vehicle 124 is a perception sensor because it provided the precoding system 199 of the ego vehicle 123 with sensor data 184 (i.e., the GPS data 185 included in the BSM message) describing the location of the remote vehicle 124.

Accordingly, a perception sensor 270 is any sensor that provides digital data describing the locations of the objects which are proximate to the ego vehicle 123 (or some other device that includes the precoding system 199 such as the remote vehicle 124 and the non-vehicular roadway endpoint 107). For example, a perception sensor is a sensor that generates digital data that describes one or more AoAs and AoDs for one or more objects, or digital data from which the one or more AoAs or AoDs for the one or more objects can be determined.

The following are additional examples of perception sensors 270: a camera; a LIDAR sensor; a radar sensor; any range finder sensor; a laser altimeter; an infrared detector; a motion detector; and a sound detector.

Referring back to FIG. 1E. The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The ego vehicle 123 may include one or more memories 127.

The memory 127 of the ego vehicle 123 stores one or more of the following types of digital data: sensor data 184; GPS data 185; angle data 186; propagation data 187; channel data 188; message data 189; and BSM data 190. In some embodiments, the memory 127 stores, as digital data, any data described herein. In some embodiments, the memory 127 stores any data that is necessary for the precoding system 199 to provide its functionality.

The BSM data 190 is digital data that is received in a BSM message. The BSM data 190 is depicted in FIGS. 5A and 5B, and described in more detail below with reference FIGS. 5A and 5B. In some embodiments, the memory 127 stores DSRC data which is digital data received in a DSRC message. The DSRC data describes any information that is included in the BSM data 190. For example, a BSM message is a special type of DSRC message which is transmitted at a regular interval (e.g., once every 0.10 seconds), but the content or payload of a DSRC message (i.e., the DSRC data) is the same as that of a BSM message (i.e., the DSRC data for a DSRC message is the same as or similar to the BSM data for a BSM message).

In some embodiments, the BSM data 190 is received by the ego vehicle 123 in a BSM message which is broadcasted by the remote vehicle 124 or the non-vehicular roadway endpoint 107. This broadcast may occur at regular intervals such as once every 0.10 seconds, which is the user-configurable default defined by the DSRC standard.

The sensor data 184 is digital data that describes the measurements of the sensor set 170. For example, the sensor data 184 describes the measurements of one or more perception sensors. The sensor data 184 describes the locations of one or more objects which are proximate to the ego vehicle 123. For example, the sensor data 184 describes the locations of all objects which are within 1000 meters of the ego vehicle 123 (because, for example, 1000 meters is the range of a DSRC message). In some embodiments, the sensor data 184 includes the BSM data 190 and the GPS data 185.

In some embodiments, the BSM data 190 includes one or more of the following: (1) GPS data 185 for the DSRC-equipped electronic device that transmitted the BSM message which included the BSM data 190 [e.g., the remote vehicle 124 or the non-vehicular roadway endpoint 107]; and (2) a received identifier [a "received ID"] for the DSRC-equipped electronic device that transmitted the BSM message which included the BSM data 190 [e.g., the remote vehicle 124 or the non-vehicular roadway endpoint 107]. The GPS data 185 included in the BSM data 190 describes the geographical location of the DSRC-equipped electronic device that transmitted the BSM message which included the BSM data 190 [e.g., the remote vehicle 124 or the non-vehicular roadway endpoint 107]. The received ID is digital data that describes a unique identifier of the DSRC-equipped electronic device that transmitted the BSM message which included the BSM data 190. The received ID is used by the precoding system 199 to differentiate among different instances of BSM data 190 which are transmitted by different DSRC-equipped electronic devices.

The GPS data 185 is digital data that describes a geographic location of an object. For example, the GPS data 185 describes the geographic location of one or more of the ego vehicle 123, the remote vehicle 124 and the non-vehicular roadway endpoint 107. In some embodiments, the GPS data 185 describes the geographic location of the object with lane-level accuracy.

In some embodiments, the memory 127 one or more instances of the GPS data 185. For example, the memory 127 stores: a first instance of GPS data 185 that describes the geographic location of the ego vehicle 123; and a second instance of GPS data 185 that describes the geographic location of the DSRC-equipped electronic device that transmitted the BSM message which included the BSM data 190 (e.g., the remote vehicle 124). The first instance of GPS data 185 is retrieved by the DSRC-compliant GPS unit 150 of the ego vehicle 123. The second instance of GPS data 185 is retrieved by a DSRC-compliant GPS unit of the DSRC-equipped electronic device that transmitted the BSM message which included the BSM data 190 (e.g., the remote vehicle 124).

The angle data 186 is digital data that describes one or more of the following: (1) one or more AoAs for each of the objects whose location is described by the sensor data 184; and (2) one or more AoDs for each of the objects whose location is described by the sensor data 184.

In some embodiments, the precoding system 199 includes code and routines that are operable, when executed by the processor 125, to cause the processor 125 to determine the angle data 186 based on the sensor data 184.

The propagation data 187 is digital data that describes one or more of the following: (1) a list of paths between the transmitter and the receiver of a mmWave message; and (2) channel gains for each path included in the list of paths. For example, the ego vehicle 123 is transmitting a mmWave message to the remote vehicle 124. In this example, the ego vehicle 123 is the transmitter (TX) and the remote vehicle 124 is the receiver (RX). The location of the ego vehicle 123 is known because it is described by the GPS data 185. The location of the remote vehicle 124 is known because it is described by one or more of the sensor data 184 (based on measurements of the sensor set 170) or the GPS data 185. Here, the GPS data 185 describing the location of the remote vehicle 124 is based on a DSRC message, transmitted by the remote vehicle 124 and received by the ego vehicle 123, and including BSM data 190 (or similar data) which includes digital data describing the geographic location of the remote vehicle 124; the precoding system 199 parses the digital data describing the geographic location of the remote vehicle 124 from the BSM data 190 and stores it as GPS data 185 in the memory 127.

Accordingly, both the location of the transmitter and the location of the receiver are known. Additionally, the sensor data 184 describes the locations of the other objects between the location of the transmitter and the location of the receiver. Based on this information, the precoding system 199 analyzes the locations of the transmitter, the receiver and the other objects between the location of the transmitter and the location of the receiver in order to determine one or more paths between the transmitter and the receiver (i.e., a list of paths) and the channel gains for each of the one or more paths. The preceding paragraph is an example of the precoding system 199 determining the propagation data 187 based on the sensor data 184 according to some embodiments.

In some embodiments, the list of paths includes one or more of the following: (1) a line of sight path between the transmitter and the receiver of the mmWave message; and (2) and one or more single reflection paths between the transmitter and the receiver. In some embodiments, the line of sight path and the total number of the reflection paths are summed to determine a variable L, which is the total number of paths. See, for example, FIG. 4A, which includes an analysis 400 which receives, among other things, the variable L as an input in order to determine the channel data 188.

Referring back to FIG. 1E. The channel data 188 is digital data that describes one or more channels for transmitting a mmWave message from the transmitter to the receiver. The precoding system 199 includes code and routines that is operable, when executed by the processor 125, to cause the processor 125 to analyze one or more of the sensor data 184 and the propagation data 187 and determine the channel data 188 based on these inputs. The one or more channels described by the channel data 188 may be organized as a channel matrix. For example, the precoding system 199 includes code and routines that is operable, when executed by the processor 125, to cause the processor 125 to analyze one or more of the sensor data 184 and the propagation data 187 using the analysis 400 depicted in FIG. 4A and determine a channel matrix is H which includes the one or more channels for transmitting a mmWave message from the transmitter to the receiver.

The message data 189 is digital data that describes the mmWave message which is transmitted by the transmitter. In some embodiments, the mmWave message includes a payload which cannot be transmitted using other forms of wireless communication due to bandwidth or speed limitations. For example, the payload includes one or more of the following: (1) high definition (HD) 3D maps [potentially several gigabytes, or even a terabyte, in size]; (2) high definition sensor data; and (3) high definition infotainment data such as movies and other content.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection-Application interface EN 11253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); EN 13372:2004 Dedicated Short-Range Communication (DSRC)-DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a DSRC radio 247 (see, e.g., FIG. 2). The DSRC radio 247 is a tangible electronic device that includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band.

In some embodiments, the DSRC radio 247 includes a non-transitory memory which stores digital data that controls the frequency for broadcasting BSM messages. In some embodiments, the non-transitory memory stores a buffered version of the GPS data 185 for the ego vehicle 123 so that the GPS data 185 for the ego vehicle 123 is broadcast as an element of the BSM messages which are regularly broadcast by the DSRC radio 247.

In some embodiments, the DSRC radio 247 includes any hardware or software which is necessary to make the ego vehicle 123 compliant with the DSRC standards. In some embodiments, the DSRC-compliant GPS unit 150 is an element of the DSRC radio 247.

In some embodiments, the communication unit 145 includes a radio set 144. The radio set includes one or more of the following: a mmWave radio 245 as depicted in FIG. 2; and a lower frequency radio 246 as depicted in FIG. 2.

The mmWave radio 245 is a tangible electronic device that includes a mmWave transmitter device and a mmWave receiver device (e.g., a mmWave antenna). The mmWave transmitter device is operable to transmit and broadcast mmWave messages over the on the band of spectrum between 30 GHz and 300 GHz. The mmWave receiver device is operable to receive mmWave messages over the band of spectrum between 30 GHz and 300 GHz.

The lower frequency radio 246 is a tangible electronic device that includes a transmitter and a receiver (e.g., an antenna) which is operable to send and receive wireless messages using any band which is less than 30 GHz (e.g., less than the lowest band of the mmWave spectrum).

In some embodiments, the mmWave radio 245 is used by the precoding system 199 to form multiple beams. The lower frequency radio 246 is used for node discovery (e.g., to identify the presence of one or more objects which are proximate to the device which includes the precoding system 199). The perception sensor of the sensor set 170 provides digital data (e.g., the sensor data 184) that describes the locations of one or more objects which are proximate to the device which includes the precoding system 199. The digital data describing the locations of surrounding objects are used by the precoding system 199 to predict potential propagation of the one or more objects which are proximate to the device which includes the precoding system 199 (e.g., angle data 186).

For example, perception sensor generates sensor data 184 that either describes the AoAs and the AoDs for the one or more objects which are proximate to the device which includes the precoding system 199, or includes digital data that is usable for determining these AoAs and the AoDs (e.g., determining the angle data 186). The precoding system 199 analyses the AoAs and the AoDs to determine a line-of-sight path and all single-reflection paths between the transmitter and the receiver, taking into consideration the location of the other objects which are proximate to the transmitter and the receiver as described by the sensor data 184 and the headings of these objects as described by the angle data 186. The precoding system 199 also analyses the AoAs and the AoDs to determine the channel gains for each of these paths. A list of paths may include the line-of-sight path and all single-reflection paths between the transmitter and the receiver. The sensor-based dynamic precoding module analyses the list of paths, and the channel gains for each of the paths included in the list of paths, to determine one or more channels for transmitting the mmWave message to the receiver.

In some embodiments, the precoding system 199 includes code and routines that are operable, when executed by the processor 125, to cause the processor 125 to execute one or more of the steps of the method 300 described below with reference to FIG. 3. In some embodiments, the precoding system 199 includes code and routines that are operable, when executed by the processor 125, to cause the processor 125 to execute one or more of the steps of the process flow 401 described below with reference to FIG. 4B.

In some embodiments, the precoding system 199 of the ego vehicle 123 may be implemented using hardware including a field-programmable gate array ("FPGA") or an application-specific integrated circuit ("ASIC"). In some other embodiments, the precoding system 199 may be implemented using a combination of hardware and software. The precoding system 199 may be stored in a combination of the devices (e.g., servers or other devices) or ego vehicles 123.

Embodiments of the precoding system 199 is described in more detail below with reference to FIGS. 1F, 2, 3, 4A and 4B.

The non-vehicular roadway endpoint 107 is any a processor based computing device which includes a mmWave radio and meets the following requirements: the non-vehicular roadway endpoint 107 is not a vehicle; the non-vehicular roadway endpoint 107 is located in a roadway environment; and the non-vehicular roadway endpoint 107 includes a precoding system 199. Examples of a non-vehicular roadway endpoint 107 include the following: an RSU; a traffic signal; a traffic camera; a traffic sign; a traffic mirror; a roadside sensor or roadside sensor arrays including a plurality of roadside sensors (e.g., a vehicle detection system, a pedestrian detection system, etc.), or any other roadside equipment which includes a processor, a power supply, a mmWave radio and the precoding system 199.

In some embodiments, the non-vehicular roadway endpoint 107 is stationary (e.g., an RSU). In other embodiments, the non-vehicular roadway endpoint 107 motion. For example, the non-vehicular roadway endpoint 107 is a non-vehicular conveyance such as a bike which is not traveling at a roadway speed.

The remote vehicle 124 is a vehicle which is similar to the ego vehicle 123 but located at a different location than the ego vehicle 123 (e.g., in an adjacent lane, 900 meters away and traveling in an opposite direction, etc.). The remote vehicle 124 includes elements which are similar to the ego vehicle 123, and so those descriptions will not be repeated here. For example, the remote vehicle 124 includes a precoding system 199.

In some embodiments, the various precoding systems 199 of the ego vehicle 123, the remote vehicle 124 and the non-vehicular roadway endpoints 107 cooperate with one another to assist in the selection of one or more channels for transmitting mmWave messages. For example, they assist one another to perform mmWave beamforming, channel training and acquiring the data stored in the memory 127 and necessary for the precoding system 199 to provide its functionality.

Figure 1F:
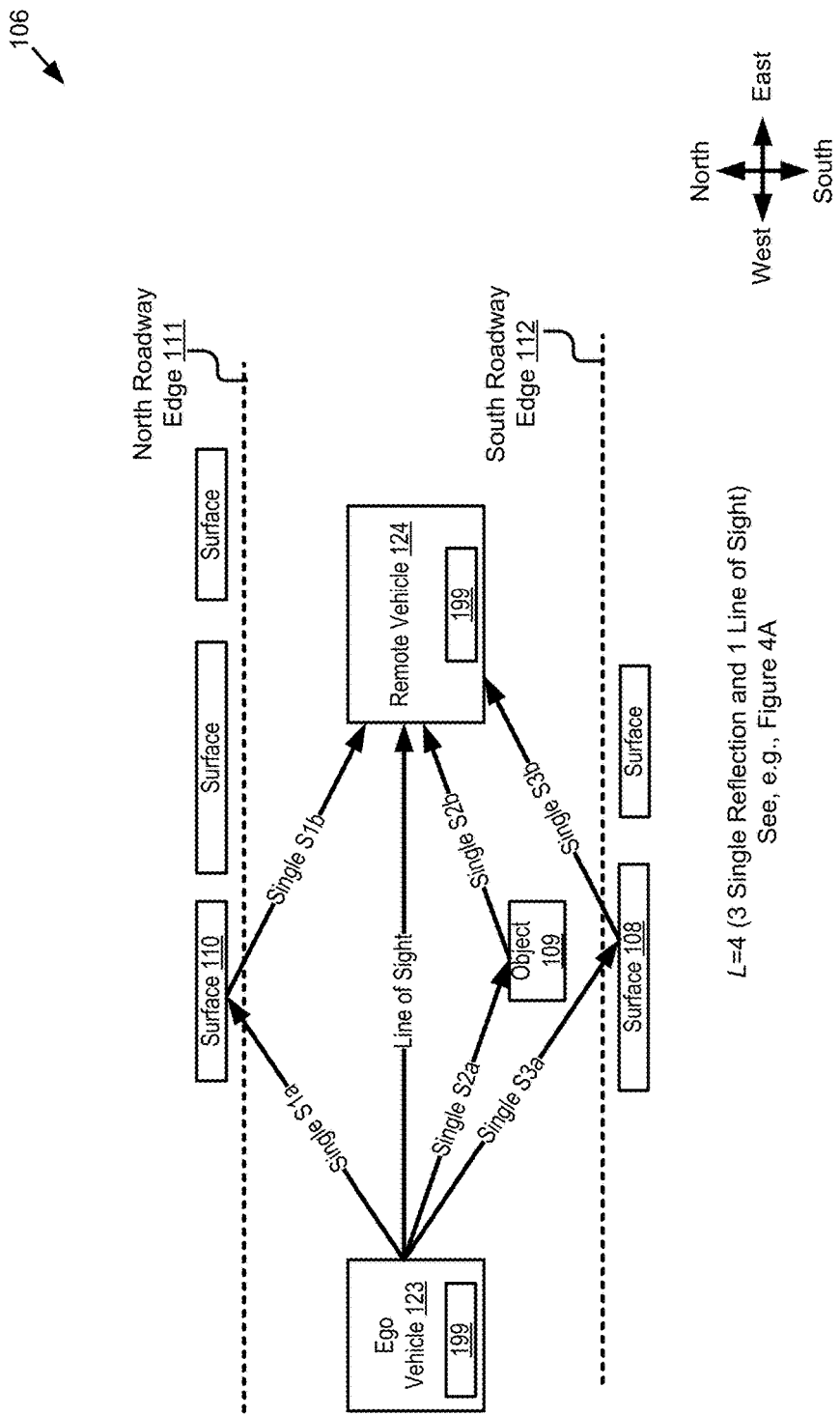
FIG. 1F is a block diagram illustrating an example of a mobile environment including a dynamic application of a set of precoding systems according to some embodiments.

Referring now to FIG. 1F, depicted is a block diagram illustrating an example of a mobile environment 106 including a dynamic application of a set of precoding systems 199 according to some embodiments.

The depicted embodiment of the mobile environment 106 includes the following elements: an ego vehicle 123; a remote vehicle 124; a surface 110; a surface 108; an object 109 and two roadway edges 111, 112 which form the north and south boundaries of a roadway, respectively, which is traveled by the ego vehicle 123 and the remote vehicle 124. The ego vehicle 123 and the remote vehicle 124 were described above with reference to FIG. 1E, and so, those descriptions will not be repeated here.

As depicted in FIG. 1F, the ego vehicle 123 is a transmitter of a mmWave message which relies on dynamic sensor-based precoding provided by the precoding system 199 and the remote vehicle 124 is the receiver of this mmWave message. The precoding system 199 of the ego vehicle 123 has identified a list of four paths for transmitting the mmWave message: (1) a single reflection path S1 formed by segment S1$a$ and segment S1$b$; (2) a line of sight path; (3) a single refection path S2 formed by segment S2$a$ and segment S2$b$; and (4) a single reflection path S3 formed by segment S3$a$ and segment S3$b$. The precoding system 199 can use one or more of these paths to transmit the mmWave message.

The surface 110 and the surface 108 are tangible objects which have physical properties which enable them to reflect a mmWave message. In some embodiments, the surfaces 110, 108 are not located within a roadway which is located south of the north roadway edge 111 and north of the south roadway edge 112. For example, the surface 110 is a building, billboard, sidewalk, infrastructure component, tree or some other tangle object of the mobile environment 106 which not present on the roadway. In some embodiments, the surface 110 and the surface 108 are substantially non-transitory object. For example, surface 110 and the surface 108 may move (i.e., the surface 110 may sway, such as is common of objects such as buildings, trees, etc.) while also being non-transitory relative to their geographic locations as measured over time.

The object 109 is a tangible object which has physical properties which enable it to reflect a mmWave message. In some embodiments, the object 109 is located within the roadway which is located south of the north roadway edge 111 and north of the south roadway edge 112. For example, the object 109 is a vehicle which is not the intended recipient of the mmWave message, a bicycle, a sign or some other tangible object which is present on the roadway which is located south of the north roadway edge 111 and north of the south roadway edge 112. In some embodiments, the object 109 is a transitory object. For example, the geographic location of the object 109 may change over time.

Depicted in FIG. 1F is a total of four paths for transmitting a mmWave message: three single reflection paths (S1, S2 and S3); and one line of sight path. Accordingly, in the embodiment depicted in FIG. 1F, the variable L is equal to four.

FIG. 2 is a block diagram illustrating an example precoding system 199 according to some implementations. The precoding system 199 may include a precoding module 299, the processor 125, the communication unit 145, the DSRC-compliant GPS unit 150, the sensor set 170 and the memory 127 according to some examples. The components of the precoding system are communicatively coupled by the bus 120.

In the illustrated implementation, the processor 125 is communicatively coupled to the bus 120 via a signal line 224. The memory 127 is communicatively coupled to the bus 120 via a signal line 226. The communication unit 145 is communicatively coupled to the bus 120 via a signal line 228. The sensor set 170 is communicatively coupled to the bus 120 via a signal line 230. The DSRC-compliant GPS unit 150 is communicatively coupled to the bus 120 via a signal line 232.

The following elements were described above with reference to FIG. 1E, and so, their descriptions will not be repeated here: the processor 125; the memory 127; the communication unit 145; the mmWave radio 245; the lower frequency radio 246; the DSRC radio 247; the sensor set 170; the perception sensor 270; and the DSRC-compliant GPS unit 150.

In some embodiments, the memory 127 stores some or all of the data described above with reference to FIGS. 1E and 1F, and below with reference to FIGS. 2, 3, 4A, 4B, 5A and 5B. The memory 127 stores any data necessary for the precoding system 199 to provide its functionality.

In the illustrated implementation shown in FIG. 2, the precoding system 199 includes a communication module 202 and a determination module 204. These components of the precoding system 199 are communicatively coupled to each other via the bus 120. In some implementations, components of the precoding system 199 can be stored in a single server or device. In some other implementations, components of the precoding system 199 can be distributed and stored across multiple servers or devices.

The communication module 202 can be software including routines for handling communications between the precoding module 299 and other components of the precoding system 199. In some implementations, the communication module 202 can be a set of instructions executable by the processor 125 to provide the functionality described below for handling communications between the precoding module 299 and other components of the precoding system 199. In some implementations, the communication module 202 can be stored in the memory 127 of the precoding system 199 and can be accessible and executable by the processor 125. The communication module 202 may be adapted for cooperation and communication with the processor 125 and other components of the precoding system 199 via a signal line 222.

The communication module 202 sends and receives data, via the communication unit 145, to and from one or more elements of the operating environment 104 depicted in FIG. 1E. For example, the communication module 202 receives, via the communication unit 145, the BSM data 190 from one or more of the remote vehicle 124 and the non-vehicular roadway endpoint 107.

In some implementations, the communication module 202 receives data from components of the precoding system 199 and stores the data in the memory 127. For example, the communication module 202 receives BSM data 190 and stores this digital data in the memory 127.

In some implementations, the communication module 202 may handle communications between components of the precoding system 199. For example, the communications module 202 may handle communications between the determination module 204 and the communication unit 145, the memory 127 and the processor 125, or any other elements of the precoding system 199.

The determination module 204 can be software including routines for providing dynamic sensor-based precoding to successfully transmit a mmWave message in a mobile environment in which at least one of the endpoints is a vehicle traveling at roadway speed. For example, the determination module 204 includes code and routines which, when executed by the processor 125, cause the processor 125 to provide some or all of the following functionality: executing one or more steps of the method 300 described below with reference to FIG. 3; executing the analysis 400 described below with reference to FIG. 4A; and executing the process flow 401 described below with reference to FIG. 4B. For example, the determination module 204 includes software for executing the analysis described with reference to FIG. 4A. In some implementations, the determination module 204 can be stored in the memory 127 of the precoding system 199 and can be accessible and executable by the processor 125. The determination module 204 may be adapted for cooperation and communication with the processor 125 and other components of the precoding system 199 via signal line 223.

Figure 3:
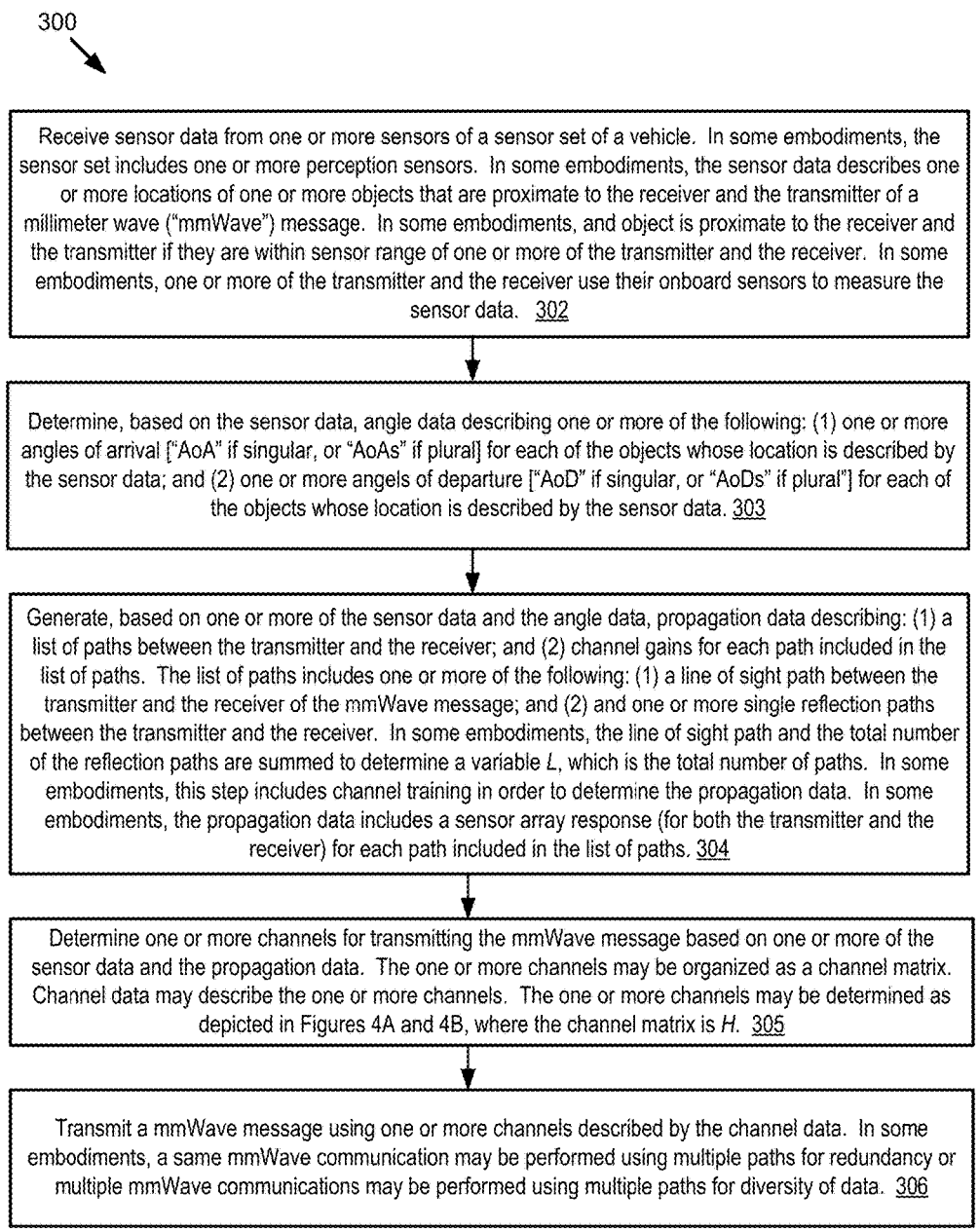
FIG. 3 is a flowchart of an example method for providing dynamic sensor-based precoding to successfully transmit a mmWave message in a mobile environment in which at least one of the endpoints is a vehicle traveling at roadway speed according to some embodiments.

Referring now to FIG. 3, depicted is a flowchart of an example method 300 for using dynamic sensor-based precoding to successfully transmit a mmWave message in a mobile environment in which at least one of the endpoints is a vehicle traveling at roadway speed.

At step 302, sensor data is received from one or more sensors of a sensor set of a vehicle. In some embodiments, the sensor set includes one or more perception sensors. In some embodiments, the sensor data describes one or more locations of one or more objects that surround the receiver and the transmitter of a mmWave message.

In some embodiments, and object is proximate to the receiver and the transmitter if they are within sensor range of one or more of the transmitter and the receiver. In some embodiments, one or more of the transmitter and the receiver use their onboard sensors to measure the sensor data. For example, the receiver collects sensor data and includes the sensor data in a wireless message (e.g., a BSM message) which is transmitted to the transmitter.

At step 303, determine, based on the sensor data, angle data describing one or more of the following: (1) one or more AoAs for each of the objects whose location is described by the sensor data; and (2) one or more AoDs for each of the objects whose location is described by the sensor data.

At step 304, generate, based on one or more of the sensor data and the angle data, propagation data describing one or more of the following: (1) a list of paths between the transmitter and the receiver; and (2) channel gains for each path included in the list of paths.

In some embodiments, the list of paths includes one or more of the following: (1) a line of sight path between the transmitter and the receiver of the mmWave message; and (2) and one or more single reflection paths between the transmitter and the receiver.

In some embodiments, the line of sight path and the total number of the reflection paths are summed to determine a variable L, which is the total number of paths.

In some embodiments, step 304 includes channel training in order to determine the propagation data. In some embodiments, the propagation data includes a sensor array response (for both the transmitter and the receiver) for each path included in the list of paths. For example, a byproduct of the channel training includes, in addition to the list of paths, also the sensor array response for each path and the channel gain for each path.

At step 305, determine one or more channels for transmitting the mmWave message based on one or more of the sensor data and the propagation data. In some embodiments, the one or more channels may be organized as a channel matrix. In some embodiments, channel data is digital data that describes the one or more channels. In some embodiments, the one or more channels are determined as depicted in one or more of FIGS. 4A and 4B, where the channel matrix is H.

At step 306, transmit a mmWave message using one or more channels described by the channel data. In some embodiments, the mmWave message is described by message data. In some embodiments, a same mmWave communication may be performed using multiple paths for redundancy or multiple mmWave communications may be performed using multiple paths for diversity of data.

The dynamic sensor-based precoding functionality provided by the precoding system 199 is advantageous for numerous reasons. For example, mmWave communication provides a broad spectrum for wireless communication, and as such, mmWave communication is able to transmit wireless messages (as described by the message data 189) having payloads far larger than anything that can be transmitted via 3G, 4G, DSRC or Wi-Fi when applied to a vehicular application where one or more of the endpoints is traveling at roadway speed.

In some embodiments, a vehicle including the precoding system 199 can use the dynamic sensor-based precoding functionality provided by the precoding system 199 to transmit large amounts of digital data describing sensor measurements to other endpoints, including a cloud server. This digital data can many gigabytes or even terabytes in size. For example, the digital data can describe a digital map for one or more large buildings.

In some embodiments, the digital data included in the payload of a mmWave message transmitted by the precoding system 199 can be used for early detection of part failure within the ego vehicle 123 which includes the precoding system 199.

In some embodiments, the digital data included in the payload of the mmWave message transmitted by the precoding system 199 can include infotainment data used to playback high definition movies.

Referring now to FIG. 4A, depicted is a block diagram illustrating an example analysis 400 for providing dynamic sensor-based precoding to successfully transmit a mmWave message in a mobile environment in which at least one of the endpoints is a vehicle traveling at roadway speed.

The output of the analysis is a channel matrix which includes a plurality of channels which are determined by the determination module of the precoding module. The channel matrix is represented in the analysis 400 by a variable H in FIG. 4A.

In some embodiments, the following are the inputs the analysis 400: a variable L which describes a total number of paths included in the list of paths (i.e., the sum of (1) the one or more single reflection paths and (2) the one or more line of sight paths); the channel gain for each path included in the list of paths; one or more AoAs for each path included in the list of paths; one or more AoDs for each path included in the list of paths; and an array response at the transmitter and the receiver for each of path included in the list of paths. In some embodiments, one or more of these inputs are described by digital data stored in the memory 127. In some embodiments, one or more of these inputs are determined by the determination module 204 by channel training in order to generate the list of paths, with the other inputs being outputted by the channel training process.

For example, the determination module 204 includes channel training software which is operating to receive one or more of the following as inputs and then perform channel training for the mmWave transmission to the receiver of the mmWave message to generate the digital data that describes the inputs to the analysis 400: the sensor data 184; the angle data 186; the GPS data 185 describing the geographic location of the transmitter of the mmWave message; and the GPS data 185 describing the geographic location of the receiver of the mmWave message. For example, the determination module 204 receives digital data describing one or more of these inputs and performs channel training which outputs digital data describing one or more of the following outputs: the variable L which describes the total number of paths included in the list of paths; the channel gain for each path included in the list of paths; the one or more AoAs for each path included in the list of paths; the one or more AoDs for each path included in the list of paths; and the array response at the transmitter and the receiver for each of path included in the list of paths. This digital data is then inputted into the analysis 400 to output the channel matrix represented by the variable H.

Figure 4B:
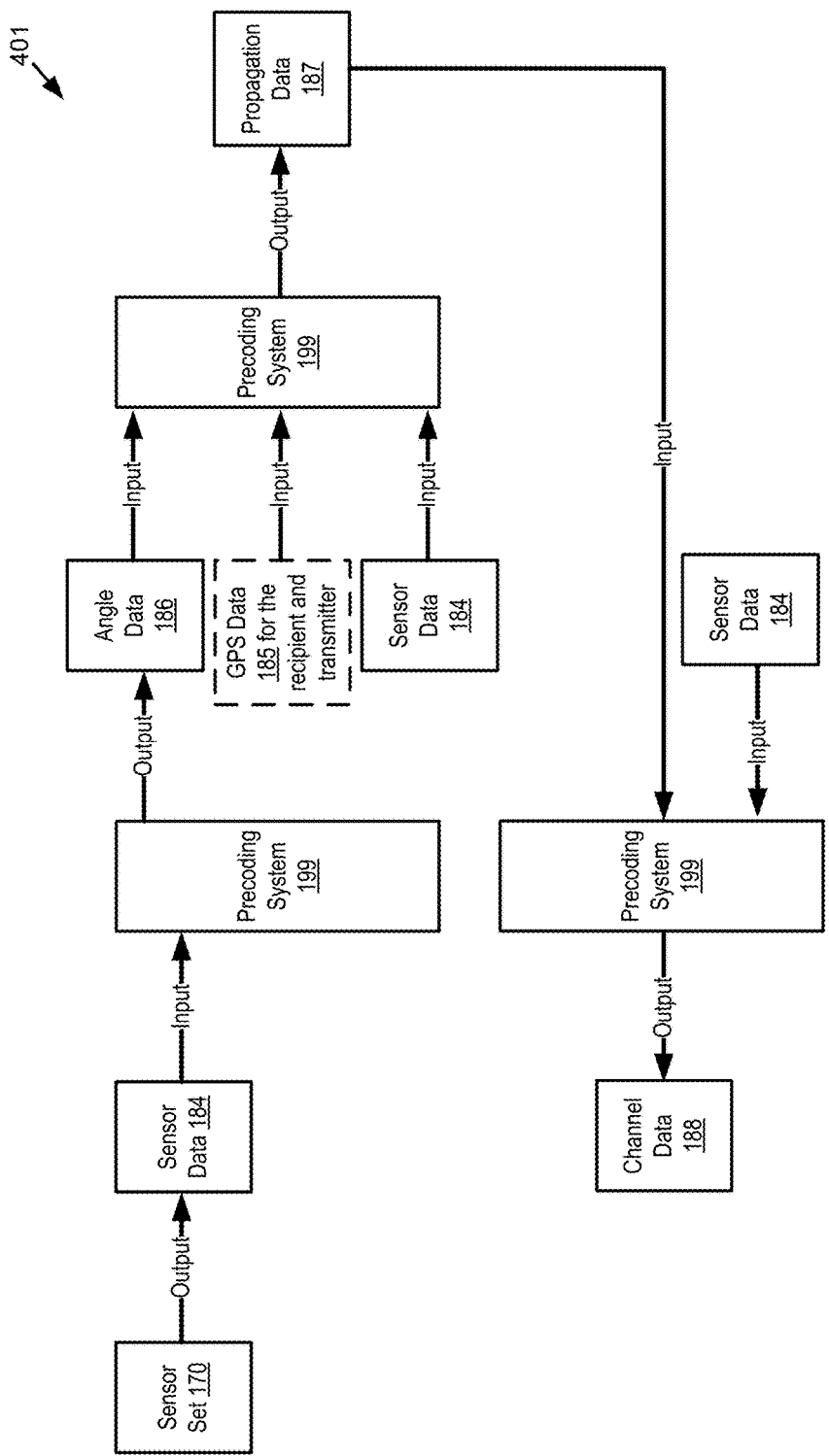
FIG. 4B is a block diagram illustrating an example process flow for determining channel data by a precoding system according to some embodiments.

Referring now to FIG. 4B, depicted is a block diagram illustrating an example process flow 401 for determining channel data by a precoding system according to some embodiments.

The sensor set 170 outputs the sensor data 184. The sensor data 184 is received as an input by the precoding system 199. The precoding system 199 analyzes the sensor data 184 and outputs the angle data 186. The precoding system 199 retrieves the GPS data 185 and the sensor data 184 from the memory 127. One or more of the following are received as inputs to the precoding system 199: the angle data 186; the GPS data 185; and the sensor data 184. The precoding system 199 analyzes the inputs and outputs the propagation data 187. One or more of the following are received as inputs to the precoding system 199: the propagation data 187; and the sensor data 184. The precoding system 199 analyzes the inputs and outputs the channel data 188.

Referring now to FIG. 5A, depicted is a block diagram illustrating an example of BSM data 190 according to some implementations.

The regular interval for transmitting BSM messages may be user configurable. In some implementations, a default setting for this interval may be transmitting the BSM message every 0.10 seconds or substantially every 0.10 seconds.

A BSM message may be broadcasted over the 5.9 GHz DSRC band. DSRC range may be substantially 1,000 meters. In some implementations, DSRC range may include a range of substantially 100 meters to substantially 1,000 meters.

Referring now to FIG. 5A, depicted is a block diagram illustrating an example of BSM data 190 according to some implementations.

A BSM message may include two parts. These two parts may include different BSM data 190 as shown in FIG. 5A.

Part 1 of the BSM data 190 may describe one or more of the following: vehicle position; vehicle heading; vehicle speed; vehicle acceleration; vehicle steering wheel angle; and vehicle size.

Part 2 of the BSM data 190 may include a variable set of data elements drawn from a list of optional elements. Some of the BSM data 190 included in Part 2 of the BSM are selected based on event triggers, e.g., anti-locking brake system ("ABS") being activated may trigger BSM data 190 relevant to the ABS system of the vehicle.

In some implementations, some of the elements of Part 2 are transmitted less frequently in order to conserve bandwidth.

In some implementations, the BSM data 190 included in a BSM message includes current snapshots of a vehicle traveling along a roadway system.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method implemented by a computer system of a vehicle that is a transmitter of a millimeter wave message which is transmitted to a receiver of the millimeter wave message, the method comprising:
    measuring, by a perception sensor, sensor data describing one or more locations of one or more objects that are proximate to the receiver and the transmitter;
    determining, based on the sensor data, angle data describing one or more angles of arrival for the one or more objects and one or more angels of departure for the one or more objects;
    generating, based on one or more of the sensor data and the angle data, propagation data describing (1) a list of paths between the transmitter and the receiver and (2) channel gains for each path included in the list of paths;
    determining, based on one or more of the sensor data and the propagation data, a plurality of channels for successfully transmitting the millimeter wave message to the receiver; and
    transmitting the millimeter wave message to the receiver simultaneously using the plurality of channels on a band of spectrum between 30 gigahertz and 300 gigahertz.

2. The method of claim 1, wherein a perception sensor is any sensor operable to measure the locations of the one or more objects.

3. The method of claim 1, wherein the list of paths includes one or more of the following: (1) a line of sight path between the transmitter and the receiver of the millimeter wave message; and (2) and one or more single reflection paths between the transmitter and the receiver.

4. The method of claim 1, wherein the propagation data is determined by channel training using the sensor data and the angle data as inputs, wherein the channel training outputs the propagation data based on these inputs.

5. The method of claim 1, wherein the plurality of channels is organized as a channel matrix.

6. The method of claim 1, wherein two or more of the channels are simultaneously used to transmit the millimeter wave message in order to provide a redundancy and a diversity of data.

7. The method of claim 1, wherein the perception sensor is an element of a different electronic device and the sensor data is wirelessly transmitted to the vehicle.

8. A system of a vehicle that is a transmitter of a millimeter wave message which is transmitted to a receiver of the millimeter wave message, the system comprising:
    a millimeter wave radio;
    a perception sensor; and
    an onboard vehicle computer system that is communicatively coupled to the millimeter wave radio and the perception sensor, the onboard vehicle computer system including a non-transitory memory storing computer code which, when executed by the onboard vehicle computer system causes the onboard vehicle computer system to:
        measure, by the perception sensor, sensor data describing one or more locations of one or more objects that are proximate to the receiver and the transmitter;
        determine, based on the sensor data, angle data describing one or more angles of arrival for the one or more objects and one or more angels of departure for the one or more objects;
        generate, based on one or more of the sensor data and the angle data, propagation data describing (1) a list of paths between the transmitter and the receiver and (2) channel gains for each path included in the list of paths;
        determine, based on one or more of the sensor data and the propagation data, a plurality of channels for successfully transmitting the millimeter wave message to the receiver; and
        transmit, by the millimeter wave radio, the millimeter wave message to the receiver using the plurality of channels on a band of spectrum between 30 gigahertz and 300 gigahertz.

9. The system of claim 8, wherein a perception sensor is any sensor operable to measure the locations of the one or more objects.

10. The system of claim 8, wherein the list of paths includes one or more of the following: (1) a line of sight path between the transmitter and the receiver of the millimeter wave; and (2) and one or more single reflection paths between the transmitter and the receiver.

11. The system of claim 8, wherein the propagation data is determined by channel training using the sensor data and the angle data as inputs, wherein the channel training outputs the propagation data based on these inputs.

12. The system of claim 8, wherein the plurality of channels is organized as a channel matrix.

13. The system of claim 8, wherein two or more of the channels are simultaneously used to transmit the millimeter wave message in order to provide a redundancy and a diversity of data.

14. The system of claim 8, wherein the receiver is a different vehicle.

15. A computer program product comprising a non-transitory memory of an electronic control unit of a vehicle storing computer-executable code that, when executed by the electronic control unit, causes the electronic control unit to:
    measure, by a perception sensor, sensor data describing one or more locations of one or more objects that are proximate to a receiver and a transmitter of a millimeter wave message, wherein the vehicle is the transmitter of the millimeter wave message;
    determine, based on the sensor data, angle data describing one or more angles of arrival for the one or more objects and one or more angels of departure for the one or more objects;
    generate, based on one or more of the sensor data and the angle data, propagation data describing (1) a list of paths between the transmitter and the receiver and (2) channel gains for each path included in the list of paths;
    determine, based on one or more of the sensor data and the propagation data, a plurality of channels for successfully transmitting the millimeter wave message to the receiver; and
    transmit the millimeter wave message to the receiver using the plurality of channels on a band of spectrum between 30 gigahertz and 300 gigahertz.

16. The computer program product of claim 15, wherein a perception sensor is any sensor operable to measure the locations of the one or more objects.

17. The computer program product of claim 15, wherein the list of paths includes one or more of the following: (1) a line of sight path between the transmitter and the receiver of the millimeter wave; and (2) and one or more single reflection paths between the transmitter and the receiver.

18. The computer program product of claim 15, wherein the propagation data is determined by channel training using the sensor data and the angle data as inputs, wherein the channel training outputs the propagation data based on these inputs.

19. The computer program product of claim 15, wherein the plurality of channels is organized as a channel matrix.

20. The computer program product of claim 15, wherein two or more of the channels are simultaneously used to transmit the millimeter wave message in order to provide a redundancy and a diversity of data.

\* \* \* \* \*